Oct. 12, 1965  R. M. HENDERSON ETAL  3,211,988
VOLTAGE REGULATOR WITH ACCELERATED SWITCHING MEANS
Filed July 13, 1961
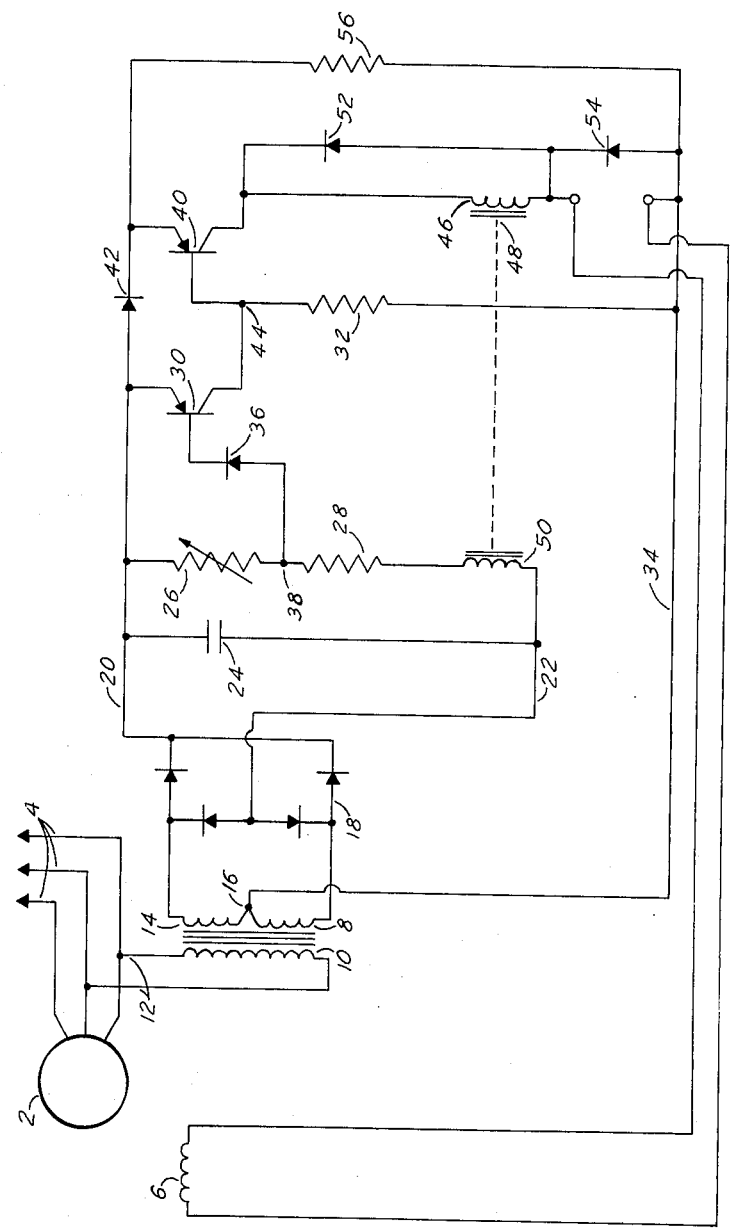
INVENTORS.
ROBERT M. HENDERSON
RICHARD ZECHLIN United States Patent Office 3,211,988
Patented Oct. 12, 1965

3,211,988
VOLTAGE REGULATOR WITH ACCELERATED SWITCHING MEANS
Robert M. Henderson, Williams Bay, and Richard Zechlin, Beloit, Wis., assignors, by mesne assignments, to Fairbanks Morse Inc., New York, N.Y., a corporation of Delaware
Filed July 13, 1961, Ser. No. 123,739
6 Claims. (Cl. 322—28)

This invention relates to voltage regulators and is particularly directed to novel voltage regulators for use with alternators and the like.

The need for and advantages of providing voltage regulation for alternators and the like are well known and numerous devices have been proposed heretofore for accomplishing such regulation. However, none of the prior art voltage regulators have been entirely satisfactory. Many of the prior art devices have been large and bulky. Others have been complicated and expensive.

These and other disadvantages of prior art voltage regulators are overcome with the present invention and a novel voltage regulator is provided which is compact in size, simple in circuitry and construction and is economical to produce.

The advantages of the present invention are preferably attained by providing a novel voltage regulator for use with alternating voltage equipment having a field winding, said voltage regulator comprising a sensing circuit for sensing the voltage to be regulated, a control circuit, a first transistor included in said control circuit, a second transistor controlled by said first transistor and connected to regulate the flow of current to said field winding, and a zener diode responsive to the voltage of said sensing circuit to control said first transistor.

Accordingly, it is an object of the present invention to provide a novel voltage regulator for alternating voltage equipment having field windings.

Another object of the present invention is to provide a novel voltage regulator which is compact in size and economical to produce.

A further object of the present invention is to provide a novel voltage regulator which is simple in circuitry and construction.

A specific object of the present invention is to provide a novel voltage regulator for use with alternating voltage equipment having a field winding, said voltage regulator comprising a sensing circuit for sensing voltage to be regulated, a control circuit, a first transistor included in said control circuit, a second transistor controlled by said first transistor and connected to regulate the flow of current to said field winding, and a zener diode responsive to the voltage of said sensing circuit to control said first transistor.

These and other objects and features of the present invention will be apparent from the following detailed description wherein reference is made to the figures of the accompanying drawing.

In the drawing:
The circuit illustrated is a diagrammatic representation of a voltage regulator embodying the present invention.

In the form of the present invention chosen for purposes of illustration, the drawing shows an alternator 2 having output lines 4 and controlled by a field winding 6. A transformer 8 is provided and has the primary winding 10 thereof connected across the output lines 4 by conductors 12 to sense phase to phase voltage. It will be understood that primary winding 10 could, if desired, be connected to sense three phase voltage. The secondary winding 14 of transformer 8 is center-tapped at 16 to provide an energizing circuit for the components of the voltage regulator and has the opposite ends of secondary winding 14 connected across a rectifier bridge 18 to provide a sensing signal. The sensing signal is then passed by conductors 20 and 22 to a smoothing capacitor 24 and is applied across a voltage divider consisting of variable resistor 26 and fixed resistor 28.

A control transistor 30 has its emitter connected to conductor 20 and has its collector connected to center-tap 16 through a resistor 32 and conductor 34. In addition, the base of transistor 30 is connected by Zener diode 36 to the junction 38 between resistors 26 and 28 of the voltage divider. A second transistor 40 has its emitter connected through diode 42 to conductor 20 and has its base connected to the junction 44 between resistor 32 and the collector of control transistor 30. The collector of transistor 40 is connected through the primary winding 46 of a pulse transformer 48, the field winding 6 of alternator 2 and conductor 34 to the center-tap 16 of transformer 8. The secondary winding 50 of pulse transformer 48 is connected in series between resistor 28 and conductor 22. In addition, a rectifier 52 is connected in parallel with the primary winding 46 of pulse transformer 48 and a second rectifier 54 is connected in parallel with field winding 6 of the alternator 2. Also, a suitable biasing resistor 56 is connected between the emitter of transistor 40 and conductor 34.

In operation, zener diode 36 senses the voltage across variable resistor 26. Any time that the voltage in the output circuit 4 of alternator 2 rises above a preselected value, the voltage across resistor 26 will exceed the breakdown voltage of zener diode 36. When this occurs, zener diode 36 will allow current to flow in the base circuit of control transistor 30. This renders control transistor 30 conductive and allows current to flow from conductor 20 through the emitter-collector connections of transistor 30 and through resistor 32 to conductor 34. Under these conditions, the resistance of control transistor 30 is extremely low. Therefore, the current through control transistor 30 will maintain the voltage across resistor 32 at substantially the full voltage between conductors 20 and 34. Hence, little or no current will flow in the base circuit of transistor 40. Consequently, transistor 40 will be cut off and no current will flow through the collector of transistor 40.

If the voltage in output circuit 4 of the alternator 2 falls below the preselected value, the voltage across resistor 26 will fall below the breakdown voltage of zener diode 36. When this occurs, zener diode 36 will become non-conductive and will stop the flow of base current from control transistor 30. Therefore, control transistor 30 will be cut-off and will not pass current to resistor 32. As a result of this, resistor 32 will now draw current through the base circuit of transistor 40 causing transistor 40 to become conductive. When transistor 40 becomes conductive, current will flow from conductor 20 through diode 42 and the emitter-collector connections of transistor 40, through primary winding 46 of pulse transformer 48 and through the field winding 6 of alternator 2 to conductor 34.

When transistor 40 first begins to conduct, the primary winding 46 of pulse transformer 48 will appear as a high impedance due to its inductance. Moreover, this will be reflected as an apparent voltage in the secondary winding 50 of transformer 48 and will serve to accelerate the switching of zener diode 36 from conduction to non-conduction. Rectifier 52 serves to remove any energy remaining in pulse transformer 48 during periods when transistor 40 is non-conductive while rectifier 54 is a clamping rectifier and serves to prevent the inductance of field winding 6 from inducing a high negative voltage between the collector of transistor 40 and conductor 34 which might result in damage to transistor 40. Diode 42 serves to maintain the base of transistor 40 positive with respect to the emitter of transistor 40 during periods when transistor 40 is cut off.

It will be apparent that numerous variations and modifications may be made without departing from the present invention. Accordingly, it should be clearly understood that the form of the invention described above and shown in the figure of the accompanying drawing is illustrative only and is not intended to limit the scope of the invention.

What is claimed is:

1. A voltage regulator for use with alternating voltage equipment having an output circuit and a field winding, said voltage regulator being connected between said output circuit and said field winding and comprising a sensing circuit including threshold switching means connected to said output circuit, control circuit means connected to said sensing circuit, said sensing circuit operating to actuate said control circuit means to a first conduction condition whenever the output voltage across said output circuit falls below a given threshold value and to actuate said control circuit means to a second conduction condition whenever the output voltage across said output circuit exceeds said threshold value, current control means connected to regulate the flow of current to said field winding, said current control means being connected to said control circuit means, whereby said current control means is rendered conductive whenever said control circuit means is in said first conductive condition and non-conductive whenever said control circuit means is in said second conductive condition, and inductive means electrically connected between said current control means and said field winding and to said sensing circuit, said means operating upon the conduction of said current control means to provide a voltage to said threshold switching means to accelerate the switching of said sensing circuit to the first conduction condition.

2. The voltage regulator of claim 1 wherein said means for accelerating the switching of said sensing circuit comprises a transformer having a primary winding and a secondary winding, the primary winding of said transformer being connected between said current control means and said field winding, and the secondary winding of said transformer being connected to said sensing circuit.

3. A voltage regulator for use with alternating voltage equipment having an output circuit and a field winding, said voltage regulator being connected between said output circuit and said field winding and comprising a transformer having a primary winding and a tapped secondary winding, said primary winding being connected to said output circuit, a sensing circuit connected across said secondary winding, said sensing circuit including threshold switching means, control circuit means connected to said sensing circuit and to the center tap of said secondary winding, said sensing circuit operating to actuate said control circuit means to a first conduction condition whenever the output voltage across said output circuit falls below a given threshold value and to actuate said control circuit means to a second conduction condition whenever the output voltage across said output circuit exceeds said threshold value, current control means connected in series with said field winding and to the center tap of said secondary winding, said current control means also being connected to said control circuit means whereby said current control means is rendered conductive whenever said control circuit means is in said first conductive condition and non-conductive whenever said control circuit means is in said second conductive condition, and means connected between said current control means and said field winding and to said sensing circuit, said means operating upon the conduction of said current control means to provide a voltage to said threshold switching means to accelerate the switching of said sensing circuit to the first conductive condition.

4. A voltage regulator for use with alternating voltage equipment having an output circuit and a field winding, said voltage regulator being connected between said output circuit and said field winding and comprising a transformer having a primary winding and a tapped secondary winding, said primary winding being connected to said output circuit, a sensing circuit including a rectifier bridge having at least four terminals, two of said terminals connected across said secondary winding, a voltage divider connected across the remaining two terminals of said rectifier bridge, and threshold switching means connected to said voltage divider, control circuit means connected from the center tap of said secondary winding across a portion of said secondary winding, said control circuit means also connected to said threshold switching means whereby said sensing circuit operates to actuate said control circuit means to a first conduction condition whenever the output voltage across said output circuit falls below a given threshold value and to actuate said control circuit means to a second conduction condition whenever the output voltage across said output circuit exceeds said threshold value, current control means connected from the center tap of said secondary winding in series with said field winding across a portion of said secondary winding, said current control means being also connected to said control circuit means whereby said current control means is rendered conductive whenever said control circuit means is in said first conductive condition and non-conductive whenever said control circuit means is in said second conductive condition.

5. The voltage regulator of claim 4 wherein means are provided to accelerate the switching of said sensing circuit to the first conduction condition upon the conduction of said current control means, said accelerating means including a transformer having a primary winding connected in series between said current control means and said field winding and a secondary winding connected in series with said voltage divider, said transformer operating to provide voltage to said threshold switching means upon the conduction of said current control means.

6. A voltage regulator for use with alternating voltage equipment having an output circuit and a field winding, said voltage regulator being connected between said output circuit and said field winding and comprising a transformer having a primary winding connected to said output circuit and a center tapped secondary winding, a sensing circuit including a rectifier bridge having at least four terminals, two terminals of said bridge being connected across said secondary winding, a capacitor connected across the remaining two terminals of said bridge to smooth the output signals received therefrom, a voltage divider connected in parallel with said capacitor to develop signals indicative of the output voltage of said equipment, and a diode operating as a threshold switching means connected to said voltage divider, control circuit means connected to said sensing circuit whereby said sensing circuit operates to actuate said control circuit means to a first conduction condition whenever the output voltage across said output circuit falls below a given threshold value and to actuate said control circuit means to a second conduction condition whenever the output voltage across said output circuit exceeds said threshold value, said control circuit means including a first transistor having an emitter electrode connected with said voltage divider and said smoothing capacitor to one terminal of said bridge, a collector electrode connected to the center tap of said secondary winding, and a base electrode connected to said diode threshold switching means, current control means connected to said control circuit means whereby said current control means is rendered conductive whenever said control circuit means is in said first conductive condition and non-conductive whenever said control circuit means is in said second conductive condition, said current control means including a second transistor having an emitter electrode connected to the emitter electrode of said first transistor, a base electrode connected to the collector electrode of said first transistor, and a collector electrode connected in series with said field winding to the center tap of said secondary winding, means to accelerate the switching of said sensing circuit to the first conductive condition upon the conduction of said current control means, said means including a transformer having a primary winding connected in series between the collector of said second transistor and said field winding and a secondary winding connected in series with the voltage divider of said sensing circuit whereby voltage is provided to said threshold switching diode upon the conduction of said second transistor, and rectifier means connected in parallel with the primary winding of the transformer of said accelerating means, said rectifier means operating to remove energy remaining in the transformer of said accelerating means when said current control means is non-conductive.

References Cited by the Examiner

UNITED STATES PATENTS

| | | |
|---|---|---|
| 2,945,174 | 7/60 | Hetzler. |
| 2,972,712 | 2/61 | Landstorfer. |
| 3,008,082 | 11/61 | Schlicher. |
| 3,093,790 | 6/63 | Ehret _____ 323—22 |
| 3,136,940 | 6/64 | Carlson _____ 322—73 |

LLOYD McCOLLUM, *Primary Examiner.*